March 20, 1956  E. E. SHELDON  2,739,243
COMPOSITE PHOTOSENSITIVE SCREENS
Filed Jan. 8, 1953  2 Sheets-Sheet 1

INVENTOR.
EDWARD EMANUEL SHELDON
BY Philip B. Hilbert
HIS ATTORNEY

INVENTOR.
EDWARD EMANUEL SHELDON
BY
HIS ATTORNEY

United States Patent Office 2,739,243
Patented Mar. 20, 1956

2,739,243

COMPOSITE PHOTOSENSITIVE SCREENS

Edward Emanuel Sheldon, New York, N. Y.

Application January 8, 1953, Serial No. 330,227

22 Claims. (Cl. 250—211)

This invention relates to novel type of photocathodes for efficient picking up of signals or complete images produced by different types of invisible radiations and to novel type of electrodes for intensification of said signals or images produced by invisible radiations, and is a continuation in part of my U. S. Patent No. 2,555,423, filed April 16, 1947, of U. S. Patent No. 2,586,391, filed July 8, 1947, and U. S. Patent No. 2,603,757, filed November 5, 1948.

The present photocathodes are made of a photo-emissive, photo-conductive or of photo-voltaic layer on a suitable supporting base. These photocathodes respond well to visible light. They are, however, very insensitive to infra-red radiation of wave-length longer than one micron and on the other end of the spectrum to rays of wave-length shorter than 2000 A. These photocathodes are also completely insensitive to electron or other atomic particles radiation. Limitations of the present photocathodes are eliminated by my invention by the use of composite photocathodes comprising in combination a light reflecting layer transparent to exciting radiation, a fluorescent layer, a light transparent layer and photosensitive layer disposed in a suitable vacuum tube. The same novel construction may be used also as a photocell without a vacuum tube. This novel photocathode or photocell may be used in every signal or image reproducing system, as well as in every signal or image transmitting system such as, phototubes, electron-multiplier tubes, in image converters, in image amplifiers, and in television pick-up tubes and in image storage devices. By using this novel photocathode or photocell the invisible exciting radiation is converted in the fluorescent layer of said composite photocathode into a fluorescent light of wave length to which the photo-sensitive layer of said photocathode or photocell is most sensitive. The fluorescent light is exciting said photo-sensitive layer directly and by reflection from said reflecting layer, whereby any loss of fluorescent light is prevented, increasing markedly the efficiency of this novel photocathode. In this way radiation which would be too weak to excite the conventional photocathode may now produce photo-electric effect. The sensitivity of the novel photocathode may be further increased by elimination of the optical system for projection of the signals or images on the photocathode. In the conventional photocathode the signals or images after their conversion into a type of radiation to which said photocathode is sensitive, have to be projected thereon by means of optical system. The use of the optical system causes loss of 95% incident radiation. Elimination of the optical system would obviously result in complete deterioration of the sharpness of projected image on the conventional photocathode. In my invention, this cause of the loss of illumination is eliminated without impairing sharpness of the image, because of close apposition of fluorescent and photo-sensitive layers. This is equivalent to 20–30 fold gain in sensitivity of the composite photocathode or photocell.

Another important feature of the novel photocathode is the presence of a transparent layer between the fluorescent and photo-sensitive layers. This separating layer being extremely thin, of a few microns only, does not cause deterioration of sharpness and at the same time prevents chemical interaction of fluorescent and photo-sensitive layers which is the cause of serious complications.

The purpose of the present invention is further improvement of said composite photocathode, photocell or screen to accomplish photoelectric reproduction of images of a better detail than realized in the construction disclosed in my Patent No. 2,603,757.

I found that the separating layer in said composite photocathode or screen although of a thickness of the order of microns which is thin enough to prevent unsharpness due to diffusion of light traveling from the fluorescent layer to the photo-electric layer, still causes a certain degree of unsharpness. This phenomenon could not be explained by the geometrical spread of the light spot on its way to the photo-electric layer. I discovered that this unexpected loss of sharpness and loss of contrast was caused by multiple internal reflections of each light spot at the boundaries between the fluorescent layer and the separating layer and between the separating layer and the photoelectric layer as well. In this invention I succeeded in eliminating this deterioration of definition and contrast by reducing the thickness of said separating layer to ¼ of the wave length of the luminescent light produced by said luminescent layer in the composite screen or to an odd number of ¼ of said wave-length, but not exceeding 1¼ of wave-length.

In another modification of my invention, I accomplished my objectives by coating said separating layer on one side, or preferably on both sides, with an anti-halation layer of a thickness of ¼ or of an odd number of ¼ of the wave-length of said luminescent light.

Another objective of my present invention is improvement of the fluorescent layer to produce images of a better definition and contrast.

Another objective of my invention is improvement of the photoelectric mosaic layers to produce images of a better definition and contrast.

The photo-electric signals or images produced by the novel photocathode can be further intensified by the use of similar composite electrode comprising light reflecting layer, electron fluorescent layer, light transparent separating layer and photo-electric layer, disposed in a single or plural successive stages in the vacuum tube in cooperative relationship with said photocathode.

The composite screen in the present invention comprises improvements described above for the novel composite photocathode.

The invention will be better understood when taken in connection with the accompanying drawings.

Figure 1:
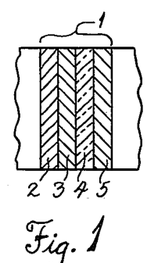
Fig. 1 represents a composite photocathode responsive to X-ray or atomic particles radiation.

Fig. 1 represents the composite photocathode 1 having a light reflecting layer 2, a fluorescent layer 3, an extremely thin light transparent separating layer 4, a photo-sensitive layer e. g. of photo-emissive type 5. This photocathode is the most suitable for atomic particles radiation and for all invisible electro-magnetic radiations of wave-length shorter than 4000 A. The invisible radiation passes through light reflecting layer 2 such as of aluminum, strikes the fluorescent layer 3 such as of ZnSAg, CcBr, CsI, NaClAg, NaTlI, LiTlI, zirconates, tungstates, silicates, sulphides, or of $BaPbSO_4$ and is converted therein into fluorescent light which is exciting directly and by reflection from the reflecting layer 2 the photo-emissive layer 5 such as of caesium, lithium or potassium on antimony, arsenic or bismuth. It is evident that the above mentioned materials are cited as examples only and many other luminescent and photoelectric materials can be used for this purpose.

The luminescent materials which means phosphors light transparent separating layer 4 even if it is of the thickness only of the order of microns produces so-called halation effect, the light traveling from the luminescent layer 3 is partly reflected at the boundary between said luminescent layer 3 and the separating layer 4 back to the layer 3. This reflection of light causes a serious deterioration of detail and contrast. Furthermore the light which penetrated into the layer 4 is again reflected and refracted at the boundary between the separating layer 4 and the photoemissive layer 5. As a result, another marked decrease in definition and contrast results. In order to overcome these drawbacks, I found that it is necessary to reduce the thickness of said separating layer 4 to ¼ of the wave length of the luminescent light produced by the layer 3 or to an odd number thereof, not exceeding however 1¼ of said wave-length. By making the separating layer 4 of such thickness all reflections are cancelled out. The theory of this optical process is well known and was described in the article in the "Physical Review," page 964, vol. 51, 1937. This novel arrangement markedly improved the definition and contrast of images reproduced by my composite photocathode or photocell.

The transparent separating layer may be of noble metals such as silver, platinum or gold, of compounds of cadmium, indium or tin, especially their oxides or halides, plastics, of silicates, silicone, silicone compounds, fluorides, borates or metallic stearates and the like. The separating layer 4 must be obviously of a material which doesn't show a detrimental chemical interaction with either the fluorescent layer 3 or the photo-emissive layer 5.

The separating layer may be produced by many various methods such as dipping in a solution, spraying, dusting, etc. These methods are well known in the art and it is believed therefore that they do not have to be described in detail.

I found however that for a critical control of thickness the best method of deposition of the separating layer is evaporation of said layer from the refractory electrode or from an exploding pellet. Also electro-deposition such as electro-plating may be used to produce a thin layer of a critical thickness.

I discovered that a few new complications had arisen when the separating layer was reduced to the thickness described above. The separating layer should be of a uniform thickness throughout the whole photocathode in order to transmit the light faithfully. Furthermore if it serves as an electrode to provide a potential for the photoemissive layer, it should be of uniform electrical conductivity.

Figure 1A:
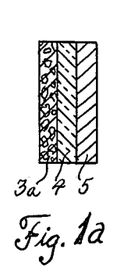
Figs. 1a to 1g show modifications of the novel composite photocathode.

All the above mentioned methods were useful for the deposition of the separating conductive layer on a smooth, even surface. In my device, however, the surface of the fluorescent layer 3 on which the separating layer 4 is deposited is a jagged uneven surface formed by irregular in size and shape fluorescent crystals as shown in Fig. 1a. It is necessary therefore prior to the deposition of the separating layer 4 of ¼ wave-length thickness of a conducting type to make the surface 3 facing said layer 4 even. This can be accomplished in some cases by forming a thin layer of nitrocellulose or other cellulose esters over the fluorescent layer 3 prior to the deposition of the separating layer 4. Otherwise the conductivity of the separating layer will be non-uniform and will result in distortion of the photoelectric image. Therefore when using a separating layer of a conducting type, it is preferable not to make this layer as thin as ¼ wave-length but to make it at least ⅝ or ⅞ wave-length in thickness; when using separating layer of non-conducting type the thickness is not as critical.

The preferred method of producing a smooth even surface of the separating layer is the following: The phosphor is deposited on a layer of Lucite (methyl methacrylate) by dusting phosphor particles on a solution of Lucite in a binder. Next, the phosphor-Lucite screen alone or with a suitable backing such as of Lucite is placed in a compression mold. The surface of the mold must be very smooth and it may be preferable to interpose a smooth ferro-type plate between the phosphor surface and the mold. The mold is then placed with the phosphor coated side of the screen down, in a press which produces a pressure of about 1500 lbs. per square inch. The mold is heated to a temperature of 120° C. and then the pressure is applied. This pressure is maintained for 10 minutes and produces a smooth regular surface of the phosphor layer. The mold is then allowed to cool to 30° C. under the pressure. In this way the phosphor surface will have a smooth mirror like appearance which is necessary for a uniform deposition of a coating of ¼ wave length thickness. The smooth uniform surface of the phosphor layer may be also produced for curved screens in a similar manner.

In some cases it is desirable to make the separating layer 4 adhere strongly to the phosphor layer 3. In such case, the separating layer of ¼ wave length of the luminescent light is evaporated in a vacuum tube on a ferro-type plate. The separating layer is next washed with a solution of Formvar. Then the ferro-type plate is placed together with a phosphor-Lucite screen in a compression mold. They are heated in the mold to 1500° C. and then are subjected to compression of about 2000 pounds per inch square for 10 to 15 minutes. Afterwards the temperature is allowed to drop to 30° C. while the pressure is maintained. If the separating layer of ¼ wave-length is porous, another two ¼ wave-length layers of separating material 4 are deposited directly on the first layer of the separating material, by the same method as was described above.

In selection of the proper material for the separating layer 4, the index of refraction of said material has to be considered. The best results are accomplished by using for said separating layer a material which has an index of refraction in which $n$ equals the square root of the product of the index of refraction, $n_1$ of the fluorescent layer 3 times the index of refraction, $n_2$ of the photoemissive layer 5, which means, $n = \sqrt{n_1 n_2}$. The selection of the transparent separating layer will therefore depend not only on the chemical characteristics of the fluorescent and photoemissive layers but on their refraction index as well.

Figure 1B:
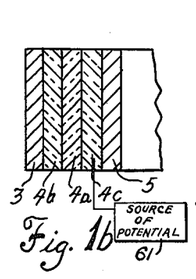

Another serious problem I encountered was that some materials used for a separating layer when reduced to a thickness of ¼ wave-length or an odd number of ¼ wave-length are not homogeneous throughout the whole thickness but show certain porosity. As the purpose of the separating layer is to prevent chemical interaction between materials used for the photo-electric layer 5 and the luminescent layer 3, it is obvious that the porosity would make said separating layer inoperative. By porosity I mean not only minute mechanical imperfections but submicroscopical loose arrangement of atoms or molecules forming said separating layer which allows migration of energetic ions or atoms through said layer. I found that the separating layer may be made more impervious without increasing its thickness. This can be accomplished by heating said antihalation layer to the temperature of 200° C. or higher or by bombardment with a beam of atomic particles such as electrons, alpha particles, protons or neutrons. Also the application of supersonic radiation of suitable energy is helpful to reduce porosity. In some cases, when dealing with very energetic chemical agents such as caesium, the above mentioned methods to improve porosity may prove insufficient and the thickness of the separating layer must be accordingly then increased. In some cases, the increase of thickness goes beyond the critical value for anti-halation. In such event, the separating layer may be of a thickness of the order of microns and should be coated on both sides with an anti-halation layer of ¼ wave-length thickness or odd number thereof, as shown in Fig. 1b. The separating layer 4a may be of silicon, silicon oxide, or other silicon compounds, plastics, fluorides, compounds of tin, indium, or cadmium, or other metals, preferably their oxides or halides, of silicates, or borates, and being of a few micron thickness will prevent any migration of ions or atoms through it. The antihalation layer 4b between the fluorescent layer and the separating layer 4 may be of one of the compounds described above for the layer 4 or 4a. The layers 4a and 4b should be preferably of different materials. The layer 4c between the separating layer and the photoelectric layer should be also of ¼ wave-length or an odd number of ¼ wave-length thickness and may be of one of the compounds described for the layer 4a or 4b. The layers 4c and 4b should be preferably of different materials. In some cases, the layer 4c may serve as a connection to the source of the potential 61 and must be then of one of the transparent conducting materials described above, such as metallic oxides.

Figure 1C:
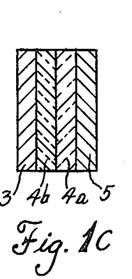
Figure 1D:
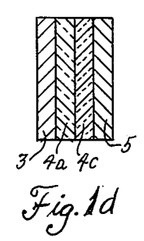

As explained above, the refraction index $n_b$ of material for the layer 4b should approximate $\sqrt{n_1 n_a}$, where $n_1$ is the refractive index of the fluorescent layer 3 and $n_a$ is the refractive index of the separating layer 4a. In the same way, the refraction index $n_c$ of the material for the layer 4c should approximate $\sqrt{n_a n_2}$, where $n_a$ is the refraction index of the separating layer 4a and $n_2$ is the refraction index of the photoelectric layer 5. In some cases, the layer 4b or the layer 4c may be omitted as shown in Figs. 1c and 1d.

In some cases, the layer 2 may serve also as a supporting layer for the composite photocathode or screen.

Figure 1E:
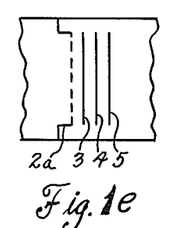
Figure 1F:
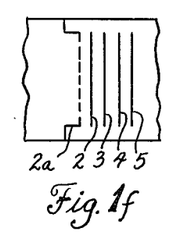

In some applications the layer 2 should be preferably of a conducting material such as silver, gold or platinum. The layer 2 may be also replaced by a fine mesh screen 2a which may be of dielectric or conducting material as shown in Fig. 1e. In other cases, it is preferable to use a mesh screen 2a as a support for all the layers 2, 3, 4 and 5 of said photocathode as shown in Fig. 1f. The light reflecting layer 2 may be also preferably omitted in some cases, or replaced by a light diffusing layer such as titanium oxide.

Figure 1G:
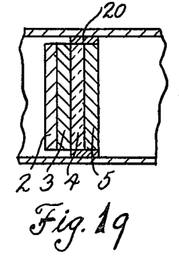

The separating layer even only of ¼ wave-length or odd number thereof thickness may also serve as a supporting layer for the composite photocathode or composite screen as shown in Fig. 1g. In such case, it may be mounted on a glass ring 20 such as of uranium glass in the manner well known in the art. After the mounting of said separating layer, a luminescent layer and, if necessary, a conducting light transparent layer, is deposited thereon. The ring carrying all these layers is now mounted in the tube envelope. The last step is the evacuation of the tube and producing the photo-emissive layer on the side opposite to the impingement of the image. It is obvious that the separating layer 4a with or without anti-halation layers 4b and 4c may be also mounted on a ring and serve as a supporting layer.

The coefficient of heat expansion of the ring, separating layer and of the wall of the vacuum tube must be harmonized to avoid the breaking of the joint during the baking of the tube. If the separating layer 4a serves as a supporting layer, and is of glass of a few microns thickness, it may be given anti-halation properties by subjecting it to a bath in hydro-silic or fluosilic acid prior to mounting it in the tube. The metallic or glass ring is then attached to the walls of the vacuum tube in a manner well known in the art.

Figure 5:
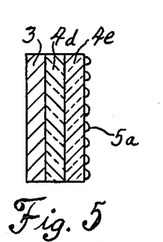
Figs. 5 and 5a represent a composite photocathode having a secondary electron emissive layer.

Another modification of my composite photocathode or screen is shown in Fig. 5. In this embodiment of the invention the fluorescent layer 3 is the same as above, but the photo-emissive layer is in the form of a mosaic layer 5a instead of being of the continuous type described above. In such case, the separating layer 4e should be of a semi-conducting or dielectric material. In particular, resistivity of the separating layer may be varied according to the application of said composite photocathode or the screen whether it is used for storage of images, or for pick-up of images. Mica and silicon oxide have resistivity of $10^{18}$–$10^{20}$ ohm-cm. The other characteristics of the separating layer 4e, in this modification, are the same as were described above.

In some cases, an additional thin, light transparent, conducting layer 4d of ¼ wave-length thickness or an odd number thereof should be provided between said luminescent layer and said light transparent semi-conducting or dielectric layer, to serve as a signal plate, besides serving as an anti-halation layer.

It is to be understood that all composite photocathodes or screens illustrated in Fig. 1 to 1g may be provided with a mosaic, photoemissive layer 5a and with a separating layer 4e of semi-conducting or dielectric material, as described above.

When the composite screen 1 is used as the amplifying electrode the layer 2 must be of light reflecting type, otherwise the light from the fluorescent layer 3 will be falling back upon the photocathode and will not only "wash out" the image on the photocathode but will also make the whole system "run away" by the continuous feedback between photocathode and composite electrode.

Figure 2:
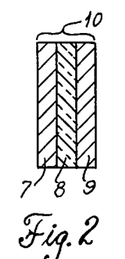
Fig. 2 represents a composite photocathode sensitive to infra-red radiation.

Fig. 2 represents composite photocathode 10 suitable for infra-red radiation. The fluorescent layer 7 may be of alkaline earth sulphides or selenides activated by cerium, samarium, europium, or by Cu or Pb. This fluorescent layer converts the infra-red signals into fluorescence of 600–1000 millimicrons wave-length, which is exciting the photoemissive layer 9 of CsOAg or of CsO and is producing photo-electron emission. The transparent separating layer 8 may be of the type described above and illustrated in Figs. 1 to 1g.

Figure 3:
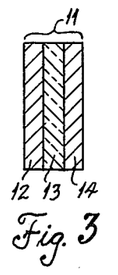
Fig. 3 represents a composite photocathode responsive to ultra-violet radiation.

Fig. 3 illustrates composite photocathode 11 sensitive to ultra-violet radiation. The fluorescent layer 12 is of calcium phosphate with activators, or of calcium silicate or barium silicate with activators. The light transparent separating layer 13 may be of the type described above and illustrated in Figs. 1 to 1f. The photo-electric layer 14 may be of caesium or potassium on antimony, potassium, sodium or uranium. The fluorescent layer 12 excited with short ultra-violet radiation converts it into ultra-violet fluorescence, which is able to excite the photo-electric layer 14. The advantage of this novel photocathode is, besides its sensitivity, the fact that it is responsive to very short ultra-violet rays, to which none of the present photocathodes is sensitive.

Figure 4:
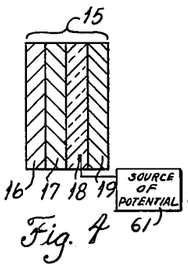
Fig. 4 represents a photoconductive modification of the composite photocathode responsive to X-rays and atomic particles radiation.

Fig. 4 shows a modification of composite photocathode 15 which is sensitive to X-rays and other electromagnetic radiations as well as to atomic particles radiation. This photocathode comprises light reflecting layer 16 such as of aluminum, gold or silver, fluorescent layer 17 such as of ZnSCdSAg, BaPbSO$_4$, tungstates, or of other phosphors such as described above. The separating layer 18 may be of the type described above and illustrated in Figs. 1 to 1f. The separating light transparent layer 18 must be in this embodiment of the invention of a conducting type. The photo-electric layer 19 is of photo-conductive type and may be of continuous or mosaic type, and may be of selenium, ZnS, CdS, PbS or of thallium sulphide. Many sulphides and selenides can be used for this purpose. The invisible X-ray radiation is converted into fluorescent light in the layer 17. The fluorescent light irradiating the photo-conductive layer 19 changes its resistance producing thereby electrical signals modulated by the pattern of said invisible X-ray image. The light reflecting layer may also serve as a supporting layer as was explained above. The light reflecting layer 16 may be also replaced by mesh screen as was described above, or may be omitted in some cases.

Figure 4A:
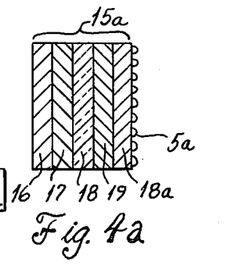
Figs. 4a to 4e show a modification of the photocathode illustrated in Fig. 4.

Fig. 4a shows a modification 15a of the composite photocathode 15 in which a photoemissive layer of continuous type 5 or of mosaic type 5a is deposited on said photoconductive layer 19. A separating transparent layer 18a must be interposed between the photoconductive and photoemissive layers 19 and 5 to prevent chemical reaction between said layers which would in a short time completely destroy their sensitivity. The separating layer 18a may be of the same type and may have the same modifications as described above for the separating layers 4, 4a or 18, which were described above. In some applications layer 18a should be preferably of a non-conducting or of a semi-conducting type and should be also preferably not translucent to the light to which the photoconductive layer 19 is sensitive. Such an opaque semi-conducting separating layer 18a may be made of materials such as special glass or fluorides coated with opaque material. I found that the thickness of said separating layer 18a should not exceed 0.15 millimeter and preferably should be of the order of 1–100 microns. If the separating layer 18a exceeds this thickness, the potential pattern formed on the photoconductive layer 19 will not be able to modulate sufficiently the emission of photoelectrons from the photoemissive layer 5. Also, the definition of the reproduced image will be destroyed in such case.

When the composite screen 15a is used as the amplifying electrode the layer 16 must be of light reflecting type, otherwise the light from the fluorescent layer 17 will be falling back upon the photocathode and will not only "wash out" the image on the photocathode but will also make the whole system "run away" by the continuous feedback between the photocathode and composite electrode.

Figure 4B:
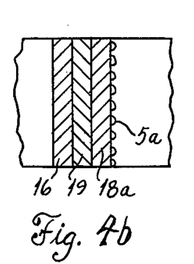

The composite photocathode or screen 15a may be sometimes simplified by using a photo-conductive material which also has fluorescent properties, such as ZnS, ZnSe, or CdSe. In such case, the fluorescent layer 17 may be omitted, at the expense however of sensitivity, see Fig. 4b. The light reflecting layer 16 may then serve also as a conducting layer. The photoemissive layer may be of mosaic or continuous type according to application.

Figures 4C, 4D, 4E:
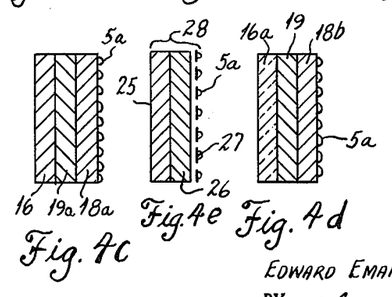

In some cases, this composite photocathode or screen may be also simplified as shown in Fig. 4c. In this modification, the layer 19a is of material such as cadmium sulphide which exhibits conductivity changes or produces a potential on its surface when irradiated by an X-ray beam or by a neutron beam. The layer 19a is not fluorescent. The changes in electrical conductivity are therefore not due to a photoconductive effect but represent a novel physical phenomenon. The same applies to the appearance of a potential on the surface of cadmium sulphide when it is irradiated by X-rays or neutrons. This is not due to the photovoltaic effect known in the prior art but represents a novel physical phenomenon. The supporting layer 16 may be then preferably of conducting type.

The novelty of composite photocathodes or screens described above and illustrated in Figs. 4a, 4b and 4c resides in the use of a protective separating layer 18a between the photoconductive layer 19 or 19a and the photoemissive layer 5 or 5a. Without said separating layer 18a, the chemical reaction between the photoconductive and the photoemissive layer, especially when the photoemissive layer 5 is of an alkali metal such as caesium, will destroy the composite photocathode in a short time. The separating layer 18a preferably should be of semi-conducting material which being of a thickness of the order of microns or only of a fraction of one micron will allow the charge or potential image on the photoconductive layer 19 to exert electrical field action through said layer 18a on the photoemissive layer 5 or 5a and at the same time will have lateral resistivity sufficient to prevent lateral diffusion or short-circuiting of said charge or potential image. A glass layer of resistivity $10^9$ to $10^{16}$ ohm-cm. is suitable for this purpose. The field action of the potential of the charge image in the layer 19 or 19a will have a better control of the photoemission if said photoemissive layer is deposited not as a continuous layer but as a mosaic layer 5a. Furthermore, this control action may be in some cases improved by interposing a conducting mesh screen between the mosaic 5a and the separating layer 18a.

In some cases, the composite photoconductive photocathode or screen may have the construction illustrated in Fig. 4d. In this modification of my invention, the photoemissive layer is of a mosaic type 5a, the separating non-transparent layer is of dielectric type and may be made of mica or precipitated silica coated with an opaque layer or of BaTiO$_3$ or of CaF$_2$, the photoconductive layer may be of the materials described above for the layer 19 or 19a and the conducting light transparent layer 16a may be of materials such as silver, gold, platinum, tin, indium or cadmium oxides or halides or of material known in the trade as "Nesa" and may serve as a signal plate.

Another modification of the composite screen is shown in Fig. 4e. In this embodiment of the invention, the first layer 25 of the composite screen 28 is of semi-conducting material such as glass of resistivity of $10^9$–$10^{12}$ ohm-cm. The next layer 26 is of dielectric material of a thickness not exceeding a few microns and may be of material such as quartz, mica, plastics, BaTiO$_3$ or CaF$_2$. The next layer 5a is a photoemissive mosaic of one of the materials described above. In some cases, a mesh screen 27 may be preferably interposed between the photoemissive mosaic 5a and the dielectric layer 26. When a mesh screen is used, the mosaic 5a may be preferably deposited on the strands of said mesh screen 27 in such a manner as not to obstruct the openings therein. The advantage of the composite screen 28 resides in the fact that the semiconducting layer 25 which serves to store the charge image is protected from the photoelectric material of the mosaic 5a. Without the protection of the separating dielectric layer 26, the photoemissive layer 5a, being conductive, will immediately short-circuit and discharge the charge image stored on the layer 25. At the same time, the separating layer 26 being very thin allows the electrical field of the charge image in the layer 25 to modulate the photoemission from the mosaic 52.

The mosaic 5a may be also produced on the mesh screen 27 in a remote part of the vacuum tube first and the mesh screen 27 carrying the mosaic 5a may be assembled together with the dielectric layer 26 afterwards. This method will prevent evaporation of the photoelectric material on the dielectric layer 26 which affects adversely the contrast of images.

The mesh screen 27 and the photoemissive layer 5a deposited thereon may be also positioned not directly on the dielectric layer 26 but in a close spacing from said layer 26, such as not exceeding a few microns and preferably being only a fraction of one micron.

Figure 5A:
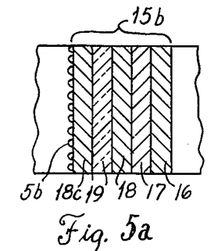

In another modification, the composite photocathode or screen 15b may have instead of a photoemissive layer a secondary electron emitting layer either of continuous or mosaic type 5b as shown in Fig. 5a. The secondary electron emitting layer may be of Ag:Mg, beryllium, aluminum or magnesium oxide, caesium or rubidium oxide or of caesium on antimony. The photoconductive layer 19 may be of the materials described above. The separating layer 18c in this modification does not have to be of non-translucent type and may be either conducting, semi-conducting or dielectric according to the application of the composite screen, or photocathode. In some cases, the layer 18c may be omitted.

Figure 5B:
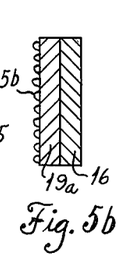
Fig. 5b shows a modification of the composite screen without the fluorescent layer.

In some cases, the fluorescent layer 17 may be omitted as shown in Fig. 5b and the secondary electron emitting layer is deposited on the layer 19a such as of CdS or CdSe which when subjected to irradiation by X-rays or neutrons exhibits X-ray or neutron induced conductivity. The layer 16 in this modification may be preferably of conducting type.

The photocathode or screen shown in Figs. 5a and 5b may be supported by the wall of the vacuum tube, by the layer 16, by separating layer or by a mesh screen, as was described above.

Figure 6:
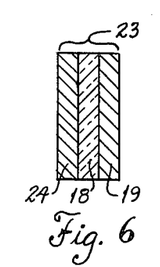
Fig. 6 represents an alternative form of photocathode sensitive to infra-red radiation.

Fig. 6 illustrates a variety of photo-conductive photocathode or screen 23 suitable for infra-red radiation. The fluorescent layer 24 is of alkaline earth sulphides or selenides activated by cerium, samarium or europium. The remaining elements of the composite photocathode are the same as described above.

The photo-conductive composite photocathode may be also made sensitive to ultra-violet radiation by making the fluorescent layer 24 of said photocathode 23 of ZnSAg, of BaPbSO4, or of calcium or barium silicates with proper activators.

Figure 7:
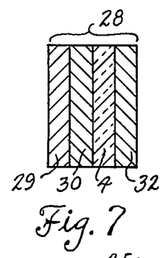
Fig. 7 represents a photovoltaic modification of the composite photocathode sensitive to X-ray and atomic particles radiation.

Fig. 7 illustrates photo-voltaic type of composite photocathode 28 having light reflecting layer 29, for example, of gold, silver or platinum, fluorescent layer 30 of ZnS, CdSAg, germanates, Mn activated silicates or other phosphors or ZnSCu, light transparent layer 4 may be of the type described above and must be in this embodiment of the invention of a conducting type and preferably should be of one of the noble metals, and a photo-voltaic layer 32, which may be of continuous or of mosaic type, of Cu2O on Cu, silicon, germanium, or selenium. The invisible radiation of electro-magnetic or corpuscular type is converted in the fluorescent layer 30 in the fluorescent light which is exciting the photo-voltaic layer 32 directly and by reflection from the reflecting layer 29 causing differences in potential over the surface of said photo-voltaic layer. These differences in potential have the pattern of the original invisible image.

Figure 7A:
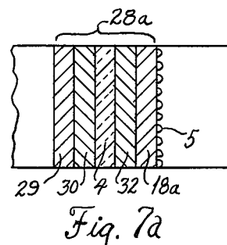
Fig. 7a shows a modification of the photocathode illustrated in Fig. 7.

Fig. 7a shows a modification 28a of the composite photocathode or screen in which a photoemissive layer of continuous type 5 or of mosaic type 5a is deposited on said photo-voltaic layer in the same way as described above for Figs. 4a to 4c. Instead of photoemissive layer a secondary electron emitting layer may be used in some cases, as was described above in Figs. 5 and 5a.

Figure 8:
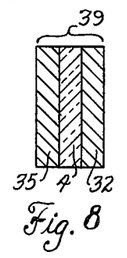
Fig. 8 represents a composite photocathode responsive to infra-red having photo-sensitive layer of photo-voltaic type.

Fig. 8 shows an alternative form of photo-voltaic photocathode which is sensitive to radiation of long wave-length such as infra-red. This composite photo-cathode 39 comprises a fluorescent layer 35 of alkaline earth sulphides or selenides activated by cerium, samarium or europium. The remaining layers are the same as was explained above. The infra-red radiation is converted by the fluorescent layer of said photocathode into fluorescent light which exciting said photo-voltaic layer causes differences in potential over its surface. These differences in potential have the pattern of original infra-red image and they may be converted into electrical signals.

Figure 9:
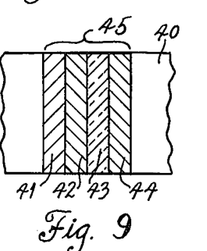
Fig. 9 represents a novel composite electrode.

Fig. 9 illustrates composite electrode 45 in vacuum tube 40 for intensification of signals or images. This novel electrode can be used for signals or images of all types of radiation. It has light reflecting layer 41, which is transparent to electrons or other atomic particles, a layer fluorescent under electron irradiation 42, a light transparent layer 43 and photoemissive layer 44. In particular the light reflecting layer 41 may be of aluminum, the electron fluorescent layer 42 of ZnSAg or of BaPbSO4, the light transparent separating layer 43 may be of the type described above as the layer 4 to 4e, the photoemissive layer 44 may be of caesium, potassium or lithium on antimony, arsenic or bismuth. Instead of a photoemissive layer 44, photoconductive layer 19 or photovoltaic layer 32 may be used also. The photoemissive, photovoltaic or photo-conductive layers may be in the form of continuous layers or of mosaic layers. The layer 41 may also serve as a supporting layer for the composite screen. In some cases, it is preferable to use as supporting layer a mesh screen as illustrated in Figs. 1e and 1f. If the mesh screen serves as a supporting layer, the light reflecting layer 41 may be made much thinner so that electrons of a low velocity will be able to pass through it.

When the composite screen 45 is used as the amplifying electrode the layer 41 must be of light reflecting type, otherwise the light from the fluorescent layer 42 will be falling back upon the photocathode and will not only "wash out" the image on the photocathode but will also make the whole system "run away" by the continuous feedback between the photocathode and composite electrode.

The supporting mesh screen can be disposed also between the separating layer 43 and the photoemissive layer 44.

In another modification of my invention, the light transparent separating layer may be used as a supporting layer as was explained above. Such layer may be made of material such as glass and may be mounted on a metallic or uranium glass ring to insure its flatness and tautness as was shown in Fig. 1g. In such case, the separating layer may be given anti-halation properties by subjecting it to a bath in hydro-silicic or fluosilicic acid prior to mounting it in the tube. The metallic or glass ring 20 is attached to the walls of the vacuum tube in a manner well known in the art. The coefficient of heat expansion of the ring 20, separating layer and of the wall of the vacuum tube must be harmonized to avoid the breaking of the joint between the ring and the tube during the baking of the tube as was explained above.

Figure 11:
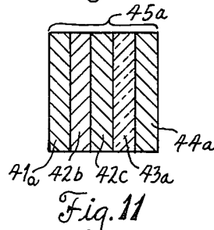
Fig. 11 shows a composite screen comprising plural fluorescent layers.

As images of all types of invisible radiation may be converted by a suitable composite photo-emissive photo-cathode, as described above, into photo-electron image, the novel electrode which is electron-sensitive may serve for intensification of signals, and images whether they are produced by U-V, I-R, gamma rays or by atomic particles. In the Fig. 9, we see intensification of electron image by said composite electrode 45. The electron beam carrying the invisible electron image, such as e. g. radar image is focused on the composite electrode 45. The electron image passes through the light reflecting layer 41, is converted by the fluorescent layer 42 into fluorescent image and said fluorescent image is exciting photo-emissive layer 44, whereby intensified photo-electron image having the pattern of the original radar image is obtained and may be now reconverted into visible image, if so desired. This process of intensification may be repeated a few times using said composite electrodes in a few stages, whereby additional intensification is obtained. In case of radar images the fluorescent layer in the composite electrode 45 should be in some instances of a long persistence, in order to avoid the flicker. Such persistent fluorescent phosphor may be of single layer type such as e. g. Zn (Mg) F₂:Mn or other fluorides, ZnSCu (Ag); Cs₂P₂O₇: Dy or ZnSCdS:Ag:Cu. Sometimes it is more advantageous to use cascade type of fluorescent screen consisting of two or more layers, as illustrated in the Fig. 11. In this form of invention the composite electrode 45a has the fluorescent layer 42 comprising two layers 42b and 42c such as e. g. ZnS(Ag) on ZnS: CdS: Cu or Al₂O₃ on ZnS:(Ag). Obviously there are many combinations of cascade long persistent fluorescent screens which can be used in this invention. The remaining parts of the composite electrode 45a such as light reflecting layer 41a, light transparent separating layer 43a and photo-emissive layer 44a are as described above. It should be understood that instead of a photo-emissive layer, a photoconductive layer may also be used, as was described above.

Figure 10:
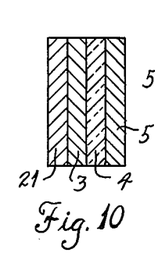
Fig. 10 represents a composite photocathode sensitive to atomic particles.

The photocathodes illustrated in Fig. 1 to 8 may be made sensitive to atomic particles radiation by enriching the fluorescent layer 3 with elements reactive to atomic particles. As neutron reactive elements may be used for example, boron, lithium, gadolinium, cadmium, indium, uranium or others. These activators should be selected according to velocity of neutrons for which the particular photocathode or screen is used. In another modification, the composite photocathode or screen illustrated in Figs. 1 to 8 may have an additional layer 21 of a material reactive to atomic particles. The layer 21 is adjacent to said fluorescent layer on the side facing said atomic particles as shown in Fig. 10. For neutron radiation, the layer 21 may be of one of the materials mentioned above such as of boron, lithium, gadolinium, cadmium, indium, uranium, paraffine or others. For proton radiation, the paraffine layer may be preferable. For high energy electrons, materials such as lead, gold, bismuth may be suitable.

It is to be understood that my invention can be also used for intensifying fluorescent screens used in combination with photographic films. In the present intensifying fluorescent screens the light emitted from the fluorescent layer is strongly refracted at the fluorescent screen-air boundary. The index of refraction of fluorescent screens is approximately 2 whereas the index of air is 1. As a result, we have a marked halation effect during the transfer of the fluorescent image to the photographic plate. As was explained above, this halation effect decreases markedly detail and contrast of the reproduced image. I found that it will be of a greater advantage to provide an anti-halation coating on the fluorescent screen of ¼ wave-length or of an old number thereof thickness. An additional improvement will be to coat the surface of the photographic film facing said intensifying screen with a similar anti-halation layer.

Further improvement of reproducing quality of my composite screen or photocathode may be obtained only by improving the fluorescent layer 3 and photoemissive 5 or photoconductive layer 19, so that they should be able to produce images of better definition and contrast.

Figure 11A:
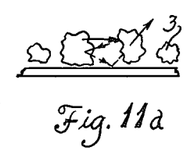
Fig. 11a illustrates the internal halation effect.

The fluorescent screens or layers known at present are causing deterioration of detail and contrast of images. The reason for it is mainly multiple internal reflections of light between crystals of said luminescent layer which process may be called an internal halation effect and which is shown in Fig. 11a. One way to remove these internal reflections and scattering of the light between the crystals is to coat each crystal with a light transparent anti-halation layer of one-quarter wave-length thickness or of an odd number thereof, but not exceeding ¾ wave-length thickness, with one of the materials described above for the separating layer. Especially silicates and fluorides are suitable for this purpose. As a result however there is a marked decrease of luminescent light output.

Figure 12:
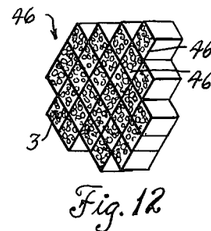
Fig. 12 shows a perforated screen for an improved fluorescent screen.

Another preferable solution to this problem in which there is no loss of light output is the construction of the fluorescent layer illustrated in Fig. 12. In this embodiment of my invention, the phosphor suspension in combination with a suitable binder such as potassium silicate is poured onto a very fine mesh screen 46 of honeycombed type. The mesh screen may be preferably made of a silica which has to be made opaque or it may be made of non-transparent metal. Such screens are well known in the art as they are used e. g. in color television, in kinescopes. In some cases a few of such screens may be cemented together in such a manner that the openings in the screen overlap each other. In this manner a honeycomb structure is made, the openings of which will be filled with phosphor material, whereas the external surface of the wires surrounding the openings will remain free from the phosphor. The wires of the screen may be coated with a protective layer of material which can be later removed by the use of suitable chemicals and which should not react with the phosphor or the binder, or by heating. Next the mesh screen is coated with the phosphor 3. The next step is to remove the phosphor from the external surface of the wires 46a of the screen dissolving the masking base. As a result the phosphor is left only in the openings 46b of the mesh whereas the phosphor on the external surface of the wires of the screen is washed away. When such a novel phosphor mesh screen is excited to luminescence, the luminescent light is confined to the area of each opening 46b and cannot spread beyond it because of the intervening wires 46a and therefore it cannot scatter throughout the phosphor layer and cause internal halation effect as it does in the present fluorescent screens. The scattering of light within each opening of the screen is still present but as each opening may be of a size of 1–15 microns only, it means smaller than an image point, it will not have any effect on the definition and contrast of the image. The phosphor may be deposited in the form of a melt, or it may be also deposited from a suspension by settling, or also by spraying or by dusting. The mesh screen with its protective coating may be also dipped in a phosphor and binder suspension. These methods are well known in the art and it is believed therefore that a detailed description is not necessary. In some cases, better results can be obtained by closing the openings in the screen on one side prior to the deposition of the phosphor on the screen with a thin layer of material such as of collodion or cellulose esters to provide a better support for the fluorescent crystals.

Instead of a mesh screen also a perforated opaque plate having multiple minute openings therein may be preferably used for this purpose. The perforated target is covered as was explained before with a protective coating in such a manner that the openings remain free. Next they are coated with a solution or suspension of a phosphor and of a suitable binder. The next step is to fire and bake the phosphor to make it adherent. Then the phosphors are removed from the solid parts of the plate between the openings by the action of a suitable solvent on the masking base. It is important that phosphor should remain within the perforations and should not stick out of said perforations. Therefore the excess of phosphor should be removed from the surface of the foraminous plate facing the separating layer. Instead of coating the whole screen or the plate with a phosphor, it is also possible to fill only the openings in said mesh screen or foraminous plate with a phosphor paste and then proceed with baking.

Another important improvement of the definition of the images produced by said luminescent layer may be accomplished, by reducing the grain of the fluorescent crystals. It is well known in the art that reducing the size of the fluorescent crystals below 10 microns size by mechanical means, such as grinding, causes a marked decrease of luminescence of such crystals. I found that by breaking the fluorescent crystals into small particles by means of supersonic radiation, I can produce crystals of a few microns size or even as small as a fraction of one micron without lowering their luminescent efficiency. The use of supersonic radiation is well known in the art of emulsification, in preparation of drugs and vaccines, but I am not aware of the use of this process for producing fine grain phosphors in the prior art.

I found that by subjecting the electrode from which the fluorescent layer is evaporated to the action of supersonic waves, I can produce very fine fluorescent particles of a size ranging from $\frac{1}{10}$ of a micron to one micron.

In addition, it is also necessary to subject the base on which the fluorescent material is deposited to the action of supersonic radiation. I found that by irradiating the base of the fluorescent layer during evaporation of phosphors I can obtain smaller particles of said phosphor and finer dispersion of the fluorescent particles over the base than it is possible with the presently known methods. The distribution of fluorescent particles produced by the use of supersonic waves shows no aggregations or lumps of fluorescent particles and has a very uniform and homogeneous character. As a result, my novel fluorescent layer is capable of a much higher definition than the fluorescent layers known at present and without the loss of light output.

Figure 14:
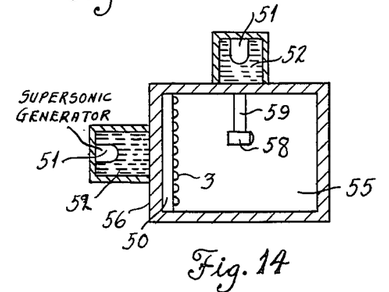
Fig. 14 shows a supersonic method of producing a fluorescent layer.

In order to accomplish this objective, the electrode 59 from which the fluorescent material 58 is evaporated is coupled with a supersonic transducer 51 by a suitable medium 52 transmitting supersonic energy, as shown in Fig. 14. Also the base of the luminescent layer which may be the wall 56 of the tube 55 or a suitable supporting layer 50 is subject to supersonic radiation from the supersonic transducer 51. The base on which the luminescent particles are deposited is provided with a binder for the phosphor such as potassium silicate, resins or cellulose esters, preferably in the colloidal form. The transducer 51 is coupled by a suitable medium 52 with the wall of the tube 55. The time of the supersonic exposure varies depending on the size of the particles desired, the type of medium in which said particles are suspended and on the frequency and energy of the supersonic radiation. As an example the following factors proved to be satisfactory: frequency of supersonic radiation 5–10 kc.; time of exposure —8 minutes with supersonic energy of 10 watts cm.$^2$. The same can be accomplished by evaporating phosphor into a solution containing the binder and then subjecting the suspension of phosphor and of binder to supersonic irradiation before or during the baking of the phosphor. The binder preferably should be of colloidal material such as colloidal potassium silicate, resins or cellulose esters. The supersonic transducer in such a case may be placed in the vessel containing phosphor suspension. The time of the supersonic exposure depends on the type of phosphor used, on concentration of phosphor, on supersonic waves transmitting medium and on the frequency and energy of the supersonic radiation applied. As a result, a fluorescent layer having homogeneous distribution of phosphor particles is obtained. Such a layer can produce images of much better definition. A similar improved fluorescent layer may be also produced from the melt of the phosphor by subjecting said melt to supersonic radiation.

There are many methods known in the art for producing a luminescent layer and it is to be understood that all such methods come within the scope of my invention, the novelty of which resides in the use of supersonic radiation to produce phosphor particles of a finer grain and to obtain a more homogeneous distribution of said particles than was possible until now.

Figure 13:
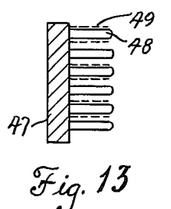
Fig. 13 shows the orientation of fluorescent particles in a fluorescent layer by supersonic radiation.

Another important improvement in the art of manufacturing fluorescent layers in screens to produce images of a better definition and without loss of luminosity is to have all luminescent crystals oriented in one direction. If the luminescent crystals are in the form of cylinders or elongated prisms, the light will be concentrated and emitted mainly from their end walls and only a small percentage of light will escape through the side walls. Such crystals can be grown artificially and may be made of various sizes. Especially tungstate phosphors are suitable for this purpose. The main problem is how to orient these luminescent crystals 48 so that they will assume in the screen a position perpendicular to the base 47 of the screen and therefore perpendicular to the exciting radiation, as shown in Fig. 13. The use of electrostatic fields for this purpose is not satisfactory as the orientation of crystals is not uniform. I found that the best method of accomplishing a uniform orientation of all crystals is to subject them to supersonic radiation. The fluorescent crystals however do not have piezoelectric properties and are not reactive to supersonic radiation. It is necessary therefore to coat the fluorescent crystals first with a piezoelectric material such as of Rochelle salt, lithium, quartz, DKT (dipotassium tartrate), ADP (ammonium dihydrogen phosphate) or others. The coating of the phosphor crystals can be accomplished by spraying, sprinkling or evaporating the piezoelectric material 49 over the phosphor. The phosphor is placed for example in a rotating drum so that all phosphor particles will be subject to the piezoelectric coating in succession. The coated particles of phosphor are next transferred into the vehicle which should be chemically inactive with phosphor particles and to have a good transmission for supersonic energy. Xylol, alcohol, benzol and others are suitable for this purpose. Also, a few percent of a suitable binder such as potassium silicate or resins are added to the mixture. Next the suspension of phosphor particles coated with piezoelectric material is subjected to supersonic radiation. The supersonic radiation may be of a low frequency such as 30–50 kc. In such case, magneto-strictive supersonic generator may be used. Better results can be obtained with a supersonic energy of a higher frequency. In such case, a piezoelectric transducer should be used. The supersonic radiation causes orientation of the coated phosphor particles in a desired direction as was explained above. The elongated phosphor particles orient themselves in the supersonic field with their surfaces perpendicular to the direction of supersonic energy. The theory of the orientation of particles by supersonic energy is given by R. Pohlmann in "Physikalische Zeitschrift" page 497, vol. 107, year 1937. The addition of an electrolyte to the suspension improves this procedure. The time of the supersonic exposure varies depending on the size and shape of the particles used, on the type of medium in which said particles are suspended and on the frequency of the supersonic radiation. I found that two minutes exposure with 300 kc. frequency and 5 watt/cm.$^2$ energy of supersonic waves will produce good results. It is to be understood that these figures are given in an illustrative sense and not in a limiting way.

The suspension of phosphor particles is evaporated and then fired to make the phosphor particles adhere to the base of the vessel or to a special support. Afterwards, the piezoelectric coating is removed by using a suitable solvent which dissolves the piezoelectric coating and is chemically inactive with phosphor particles. The solvent is siphoned off or evaporated. As a result we are left with a single or plural layer of phosphor particles oriented with their long axis perpendicular to the base. It is also possible to remove the piezoelectric coating prior to firing and baking the phosphor. After baking of the phosphor the piezoelectric material can be also removed from the surface of phosphor crystals from which light is emitted by mechanical means such as scraping or abrasion.

I also found that piezoelectric coating may be in some cases left on phosphor particles without a marked decrease of luminescent light emitted by said phosphor particles if the coating is of light transparent material such as quartz. In such a case the separating light transparent layer 4 may be eliminated from my composite photo-cathode or screen because the coating left on each crystal will serve as a layer protecting from the chemical effects of the adjacent photoelectric layer. If the coating on the luminescent phosphor crystals is not sufficient to eliminate halation effects, a light transparent antihalation layer of 1/4 wave length thickness may be added for this purpose, as was explained above, or the screen may be given a bath in hydrosilic or fluorosilic acid.

Instead of piezoelectric materials also ferromagnetic materials such as niobates or columbates may be used for this purpose. In such a case we may use either supersonic energy or a magnetic field in order to orient phosphor particles coated with these materials into proper direction.

Another improvement in increasing light output of the fluorescent layer I found could be obtained by roughening the surface of the luminescent layer from which light is emitted, by sand blasting, or by abrasion with an enamel board or preferably by blasting it with supersonic waves.

The efficiency of the photoemissive mosaic layer 5a may be also markedly improved by the method using supersonic energy in a similar way as was explained above for the preparation of the fluorescent screen. The photoefficiency of the photoemissive mosaic layer is increased if the particles or globules of the photoemissive layer are made of a very small size such as a fraction of 1 micron. I found that by subjecting the base on which the photoelectric layer is evaporated to the action of supersonic waves, I can produce very fine droplets or globules of a size ranging from $\frac{1}{50}$ of a micron to 1 micron. The action of the supersonic waves may be combined together with the heating of the evaporated photoelectric layer in order to produce a finer mosaic. In particular, this process can be applied to evaporated layers of silver and of caesium when making CsOAg photocathode as well as to layers of caesium, rubidium, lithium, potassium, antimony, bismuth or arsenic. The same process may be also advantageously used for producing mosaic photoconductive or photovoltaic cathodes described above.

I found also that by irradiating the base on which the metal layer such as silver, antimony, bismuth or arsenic is evaporated with supersonic waves instead or in combination with heating, I can also obtain not only a finer dispersion of the photosensitive particles but also a more uniform distribution that was possible with the presently known methods. It is also advisable to maintain supersonic irradiation of the base of the photocathode during the deposition of the activating alkali metal such as caesium. This method provides as was explained above for smaller particles of caesium and for their uniform distribution. The dispersion of particles produced by the use of supersonic waves shows no aggregation of photoelectric droplets and has a very homogeneous character. As a result, my novel photocathode is capable of a much higher definition than the present ones. Furthermore because of a fine dispersion of photoelectric particles, the novel photosensitive mosaic layer has a much greater active photosurface than the present ones. The efficiency of the photosensitive layer depends to a large extent on the size of the active surface. As a result, my novel photocathode exhibits a better photoelectric effect by the factor of 5 to 10. This method is especially useful for producing a mosaic of caesium on antimony.

Figure 15:
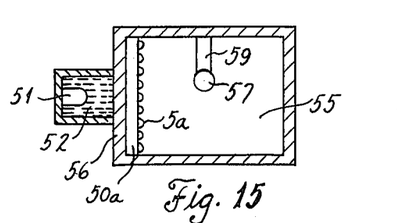
Fig. 15 shows a supersonic method of making a photoelectric mosaic.

It is obvious that there are many methods of evaporation of photoelectric substances and it is to be understood that all of them come within the scope of my invention. In order to accomplish this objective, the base 50 on which the photoelectric material 57 is evaporated, is coupled with a supersonic transducer 51 by a suitable medium 52 transmitting supersonic energy, as shown in Fig. 15. I found that supersonic radiation may act through the wall of the vacuum tube on said base 50a of the photocathode without producing any damage to the vacuum tube 55.

The time of supersonic exposure depends on the size of the particles to be produced, frequency and energy of the supersonic beam and on the supersonic energy transmitting medium. I found that ten minutes of supersonic radiation with waves of frequency 40 to 100 kc. will be sufficient for producing a mosaic photocathode of $Cs^{Sb}$ of increased sensitivity. In my composite photocathode, the mosaic photoelectric layer 5a will be evaporated on the transparent dielectric or semi-conducting separating layer 4e which will serve as a base.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A composite device comprising in combination a layer impervious to luminescent light, luminescent means adjacent and facing said light impervious layer and having said light impervious layer disposed parallel to said luminescent means, luminescent light transparent means having an electrically conducting material, said light transparent means being adjacent to said luminescent means and facing said luminescent means, and a photosensitive member facing said light transparent means.

2. A device as defined in claim 1, in which said luminescent means comprise a plurality of different from each other phosphors, said phosphors being in close proximity to each other, and at least one of said phosphors receiving the exciting radiation after said radiation penetrated through said light impervious layer, and in which device said photosensitive member has a continuous surface.

3. A device as defined in claim 1, in which said luminescent means comprise a plurality of separate layers of phosphors different from each other, said phosphor layers being parallel to each other, facing each other and successively disposes one after another, at least one of said phosphor layers receiving the exciting radiation, and in which device said luminescent means furthermore comprise a compound of the group consisting of sulphides and oxides.

4. A device as defined in claim 1, in which said light impervious layer is transmitting for the exciting radiation, said luminescent means comprise a compound of the group consisting of sulphides, silicates and fluorides, said photosensitive member is adjacent to said light transparent means and has an exposed surface, and in which device furthermore all the aforesaid parts form together a multilayer screen.

5. A device as defined in claim 1, in which said luminescent means comprise a plurality of separate layers of different from each other phosphors, at least one of said phosphors receiving the exciting radiation, and in which device furthermore said photosensitive member has a continuous surface.

6. A device as defined in claim 1, in which said light impervious layer is transmitting for the exciting radiation, in which said light transparent electrically conducting material is a continuous layer and said luminescent means comprise a plurality of different from each other phosphors, at least one of said phosphors receiving the exciting radiation, and in which device said photosensitive member has an exposed surface.

7. A device as defined in claim 1, in which said light impervious layer is transmitting for the exciting radiation, said photosensitive member has an exposed and continuous surface, is adjacent to said light transparent means and comprises an element of the group consisting of antimony and bismuth, and in which device furthermore all the aforesaid parts form together a multilayer screen.

8. A device as defined in claim 1, in which said light impervious layer is transmitting for the exciting radiation, said photosensitive member has an exposed and continuous surface and comprises an element of the group consisting of antimony and bismuth combined with the element of the group consisting of lithium and potassium, and in which device furthermore all the aforesaid parts form together a multilayer screen.

9. A device as defined in claim 1, in which said photosensitive member has an exposed and continuous surface, is adjacent to said light transparent means and comprises an element of the group consisting of antimony and bismuth combined with sodium, and in which device furthermore all the aforesaid parts form together a multilayer screen.

10. A device as defined in claim 1, in which said light impervious layer is transmitting for the exciting radiation, said luminescent means comprise a sulphide activated with an element of the group consisting of silver and cadmium, said photosensitive member has an exposed surface, and in which device furthermore all the aforesaid parts form together a multilayer screen.

11. A device as defined in claim 1, in which said light impervious layer is transmitting for the exciting radiation, in which said luminescent means comprise a compound of the group consisting of iodides, fluorides, sulphides, sulphates and tungstates, said luminescent means in addition forming a mixture with a plastic material transparent to luminescent light, said luminescent means furthermore having at least one smooth and even surface and being in contact with said electrically conducting material, and in which device said light transparent means are continuous and are connected to an external source of electrical potential.

12 A composite device comprising in combination a layer impervious to luminescent light, luminescent means adjacent and facing said light impervious layer and having said light impervious layer disposed parallel to said luminescent means, luminescent light transparent means having an electrically conducting material, said light transparent means being adjacent to said luminescent means and facing said luminescent means, and a photosensitive member having photoconductive material, all the aforesaid parts forming together a multilayer screen.

13. A device as defined in claim 12, in which said light transparent means are connected to an external source of electrical potential and said electrically conducting material is a continuous layer.

14. A device as defined in claim 12, in which said light transparent means are connected to an external source of electrical potential, in which said photoconductive material comprises a compound of the group consisting of sulphides and selenides, and in which device said luminescent means are in contact with said conducting material.

15. A device as defined in claim 12, in which said luminescent means comprise a plurality of different from each other phosphors, and in which said light transparent means are connected to an external source of electrical potential, and in which at least one of said phosphors forming a mixture with a material transparent to luminescent light, said mixture having a smooth and even surface.

16. A device as defined in claim 12, in which said luminescent means comprise a compound of the group consisting of sulphides, sulphates and tungstates, and in which device said light transparent means are connected to an external source of electrical potential.

17. A device as defined in claim 12, in which said photoconductive material comprises a compound of the group consisting of sulphides and selenides and has an exposed surface.

18. A device as defined in claim 12, in which said light transparent means are connected to an external source of electrical potential, which device has a single photosensitive member and in which device said photoconductive material is the only photoelectric material present in said photosensitive member.

19. A device as defined in claim 12, in which said luminescent means form a mixture with a plastic material transparent to luminescent light and have at least one smooth and even surface, and in which device said transparent electrically conducting material is connected to an external source of electrical potential.

20. A device as defined in claim 12, in which said electrically conducting material is a continuous layer, is connected to an external source of electrical potential and is in contact with said luminescent means, which device has a single photosensitive member and in which device said photoconductive material is the only photoelectric material present in said photosensitive member.

21. A device as defined in claim 12, in which said luminescent means comprise a plurality of separate layers of different from each other phosphors, at least one of said phosphor layers forming a mixture with a plastic material transparent to luminescent light, and in which device at least one of said phosphor layers has a smooth and even surface, and in which device said light transparent means are connected to an external source of electrical potential.

22. A device as defined in claim 12, in which said photoconductive material has an exposed surface.

References Cited in the file of this patent

UNITED STATES PATENTS

| | | |
|---|---|---|
| Re. 22,076 | Cartwright et al. | Apr. 21, 1942 |
| 2,151,496 | Beese | Mar. 21, 1939 |
| 2,269,129 | Rutledge | Jan. 6, 1942 |
| 2,337,569 | Pietschak | Dec. 28, 1943 |
| 2,407,462 | Whiteley | Sept. 10, 1946 |
| 2,476,619 | Nicoll | July 19, 1949 |
| 2,603,757 | Sheldon | July 15, 1952 |
| 2,637,535 | Arnold | May 5, 1953 |